US012674678B2

(12) United States Patent
Tatsumi et al.

(10) Patent No.: US 12,674,678 B2
(45) Date of Patent: Jul. 7, 2026

(54) IMAGE CONTROL PROGRAM, IMAGE CONTROL DEVICE, AND IMAGE CONTROL METHOD

(71) Applicant: PIONEER CORPORATION, Tokyo (JP)

(72) Inventors: Kyoko Tatsumi, Tokyo (JP); Joko Yagi, Tokyo (JP); Kaki Chin, Tokyo (JP); Takahiko Fukumoto, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 171 days.

(21) Appl. No.: 18/810,210

(22) Filed: Aug. 20, 2024

(65) Prior Publication Data

US 2025/0044114 A1 Feb. 6, 2025

Related U.S. Application Data

(63) Continuation of application No. 17/272,250, filed as application No. PCT/JP2019/030483 on Aug. 2, 2019, now abandoned.

(30) Foreign Application Priority Data

Aug. 31, 2018 (JP) ................................. 2018-163042

(51) Int. Cl.
*G01C 21/36* (2006.01)

(52) U.S. Cl.
CPC ....... *G01C 21/367* (2013.01); *G01C 21/3632* (2013.01)

(58) Field of Classification Search
CPC .............. G01C 21/367; G01C 21/3632; G01C 21/3626; G01C 21/3676; G08G 1/096861;
(Continued)

(56) References Cited

U.S. PATENT DOCUMENTS

2001/0027377 A1 10/2001 Shimabara
2004/0039523 A1 2/2004 Kainuma et al.
(Continued)

FOREIGN PATENT DOCUMENTS

EP 3220104 A1 9/2017
JP 2001272240 A 10/2001
(Continued)

OTHER PUBLICATIONS

International Search Report for related JP App. No. PCT/JP/2019/030483 dated Oct. 21, 2019; 4 pages.

*Primary Examiner* — Jason Holloway
*Assistant Examiner* — Godfrey Aleksander Maciorowski
(74) *Attorney, Agent, or Firm* — Procopio, Cory, Hargreaves & Savitch LLP

(57) ABSTRACT

An image control device includes a display control unit that controls images to be displayed on the display unit, and an acquisition unit that acquires a user operation. The display control unit switches the image to be displayed on the display unit from a first image to a second image based on the user operation acquired by the acquisition unit. The first image is an image that includes a first line and a location point information representation, the first line being a line indicating a route and representing a guided location point on the route with a shape of the first line, the location point information representation representing information related to a guided location point. The second image is an image that includes a second line, a location point mark and the location point information representation.

10 Claims, 6 Drawing Sheets

(58) Field of Classification Search
    CPC  ........... G09G 2340/12; G09G 2380/10; G06F
                    3/147; G09B 29/003; G09B 29/10
    See application file for complete search history.

(56)                   References Cited

U.S. PATENT DOCUMENTS

| | | |
|---|---|---|
| 2005/0278115 A1 | 12/2005 | Okada |
| 2006/0195257 A1 | 8/2006 | Nakamura |
| 2007/0112507 A1 | 5/2007 | Bargeron et al. |
| 2008/0243367 A1* | 10/2008 | Wako ................. G01C 21/3682 |
| | | 701/432 |
| 2010/0123737 A1* | 5/2010 | Williamson ............ G06T 15/20 |
| | | 345/672 |
| 2013/0103256 A1 | 4/2013 | Miyauchi |
| 2013/0282281 A1* | 10/2013 | Hayot ................ G01C 21/3626 |
| | | 701/533 |
| 2015/0247737 A1 | 9/2015 | van Dok et al. |
| 2016/0290819 A1 | 10/2016 | Kalyanaraman et al. |
| 2018/0128636 A1 | 5/2018 | Zhou |

FOREIGN PATENT DOCUMENTS

| | | |
|---|---|---|
| JP | 2005249622 A | 9/2005 |
| JP | 2007240198 A | 9/2007 |
| JP | 2008215858 A | 9/2008 |
| JP | 2011038970 A | 2/2011 |
| JP | 2012213129 A | 11/2012 |
| WO | 2009084126 A1 | 7/2009 |

* cited by examiner

FIG. 2

IMAGE CONTROL PROGRAM, IMAGE CONTROL DEVICE, AND IMAGE CONTROL METHOD

This application is a continuation of U.S. Ser. No. 17/272, 250 filed on Feb. 26, 2021 which is a US National Stage of International Patent Application PCT/JP2019/030483, filed on Aug. 2, 2019, which claims benefit of priority from Japanese Patent Application JP 2018-163042, filed on Aug. 31, 2018, the entire contents of which is incorporated herein by reference.

TECHNICAL FIELD

The present application relates to technical fields related to display control for switching between images each including a route, and displaying an image.

BACKGROUND ART

A car navigation device typically provides route guidance while displaying a map indicating a route from a current location to a destination on a display unit. On such a map, a line indicating a route (hereinafter, referred to as a "route line", in some cases) is displayed, and the line representing a location point on the route (for example, a location point where the route turns, such as an intersection where to make a left or right turn) with its shape is displayed in a high-lighted manner. In addition, together with a map indicating the route, a location point information representation indicating information related to the location point on the route (information indicating a location point name, a distance from the current location to the location point, and the like) is displayed on the display unit. Users are able to acquire the location point where to make a left or right turn and the information related to the location point, based on the map indicating the route and the location point information representation, and are able to travel along the route in a smoother manner.

On the other hand, a car navigation device is provided with an audio function, a television function, and the like, and is capable of displaying audio information (information such as an artist name, an album name, and a song title) and television video images on the display unit. However, the display area of the display unit is limited, and the amount of information that can be displayed is limited.

Therefore, by displaying the route in a simplified manner, the area for displaying the route on the display unit can be reduced and the area for displaying other information can be expanded, so that a large amount of information can be provided to the users. Patent Literature 1 discloses a method for representing a route with a straight line, as a method for simplifying the route. This method is also used for guiding a highway in typical car navigation devices, for example.

CITATION LIST

Patent Literature

Patent Literature 1: JP 2011-38970 A

SUMMARY OF INVENTION

Technical Problem

Here, assuming that the image is switched from an image displaying a map indicating a route and location point information representation to an image displaying a simpli-fied route and the location point information representation, there is a drawback in that it is easier to understand the correspondence relation between the location point on the route and the location point information representation because of the shape of the route line on the image before switching, whereas the route is displayed in a different shape on the image after switching, and therefore it is difficult to understand the correspondence relation between the both.

In view of the above circumstances, the present invention has an object to provide, as an example of a solution, an image control program and the like. In a case where an image is switched from an image including a route line representing a route and a location point on the route line with a shape of the line and a location point information representation to an image including the route line having a different shape of the shape and the location point informa-tion representation, a user can easily understand a corre-spondence relation between the location point on the route and the location point information representation also in the image after switching.

Solution to Problem

An invention described in claim 1 is an image control program for causing a computer to perform: a first process of causing a display unit to display a first image including a first line and a location point information representation, the first line being a line indicating a route and representing a location point on the route with a shape of the line, the location point information representation representing infor-mation related to the location point; and a second process of causing the display unit to display a second image by switching from the first image, the second image displaying a second line to associate the location point with the location point information representation, the second line being a line indicating the route and having a shape different from the shape.

An invention described in claim 8 is an image control device comprising: a first processing unit that causes a display unit to display a first image including a first line and a location point information representation, the first line being a line indicating a route and representing a location point on the route with a shape of the line, the location point information representation representing information related to the location point; and a second processing unit that causes the display unit to display a second image by switch-ing from the first image, the second image displaying a second line to associate the location point with the location point information representation, the second line being a line indicating the route and having a shape different from the shape.

An invention described in claim 9 is an image control method by an image control device, the image control method comprising: a first processing step of causing a display unit to display a first image including a first line and a location point information representation, the first line being a line indicating a route and representing a location point on the route with a shape of the line, the location point information representation representing information related to the location point; and a second processing step of causing the display unit to display a second image by switching from the first image, the second image displaying a second line to associate the location point with the location point information representation, the second line being a line indicating the route and having a shape different from the shape.

BRIEF DESCRIPTION OF THE DRAWINGS

FIG. 2 is a block diagram showing a configuration example of an on-vehicle device 200 according to an example.

EMBODIMENT FOR CARRYING OUT THE INVENTION

Embodiments for carrying out the present invention will be described with reference to FIG. 1.

Figure 1:
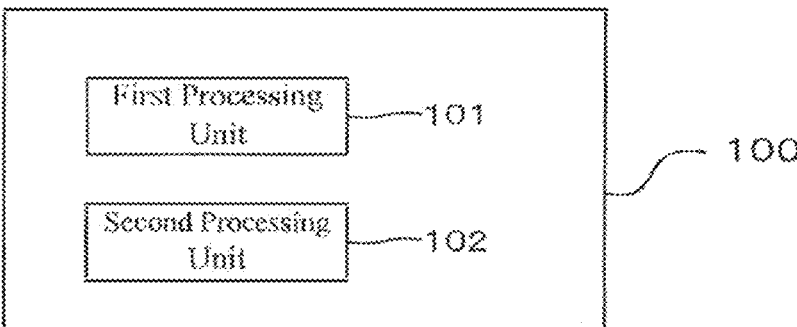
FIG. 1 is a block diagram showing a configuration example of a display control device 100 according to an embodiment.

As shown in FIG. 1, a display control device 100 includes a first processing unit 101 and a second processing unit 102.

The first processing unit 101 causes a display unit to display a first image including a first line that is a line indicating a route and that represents a location point on the route with a shape of a line, and a location point information representation that represents information related to the location point.

The second processing unit 102 causes the display unit to display a second image by switching from the first image. The second image displays a second line that is a line indicating the route and that has a different shape from the afore-mentioned shape so as to associate the location point with the location point information representation.

According to the display control device 100, the first image is switched to the second image. The first image includes the first line and the location point information representation. The first line is a line indicating the route and representing the location point on the route with a shape of the line, and the location point information representation represents information related to the location point. The second image displays the second line to associate the location point on the route with the location point information representation. The second line is a line indicating the route and having a shape different from that of the first line. Therefore, also in the image after switching, the user can easily understand the correspondence relation between the location point on the route and the location point information representation.

EXAMPLES

Next, examples corresponding to the above-described embodiment will be described. It is to be noted that the examples to be described below are examples in a case where the present invention is applied to an on-vehicle device 200.

[1. Configuration of On-Vehicle Device 200]

Figure 2:
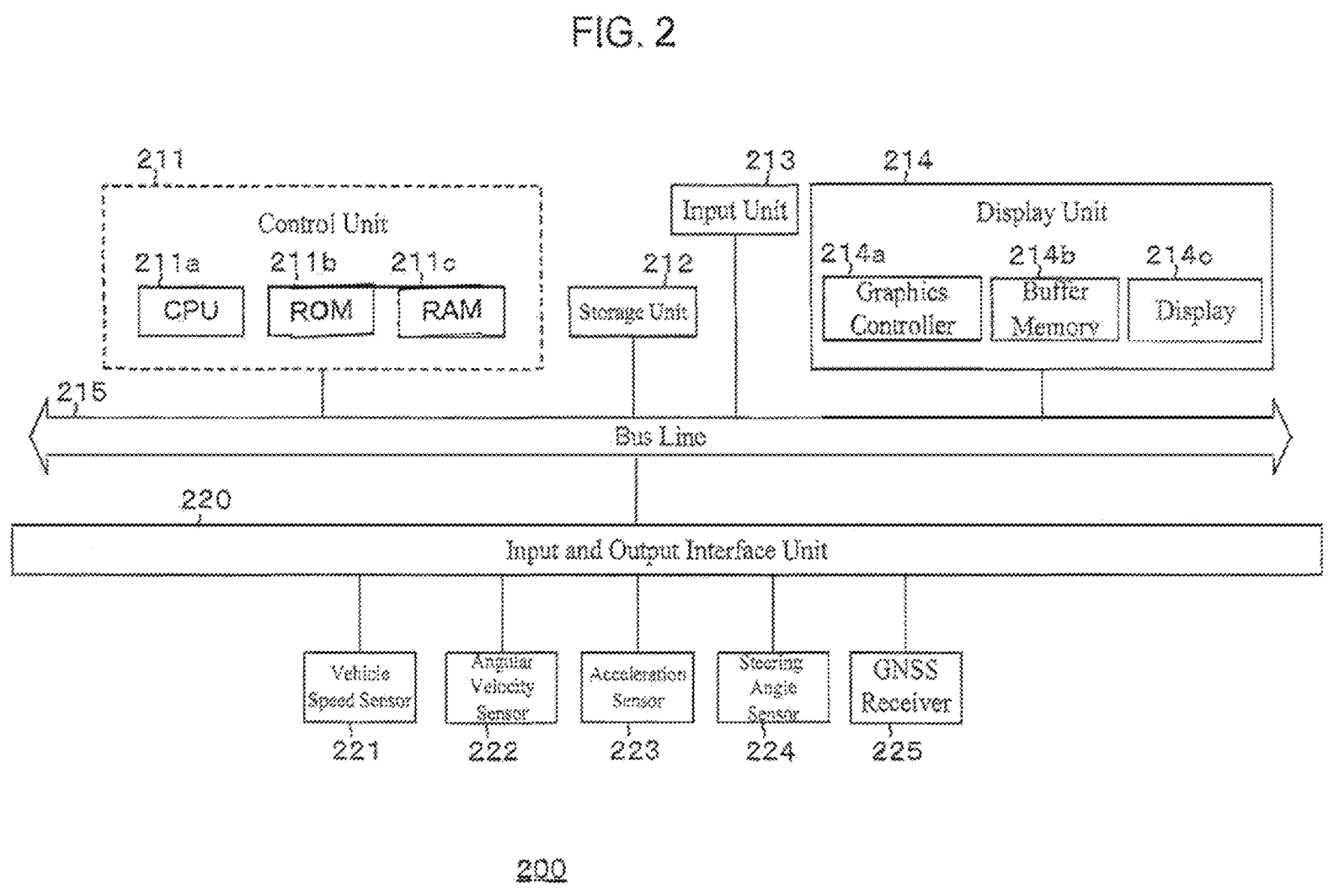

A configuration of the on-vehicle device 200 in the present example will be described with reference to FIG. 2. As shown in FIG. 2, the on-vehicle device 200 is configured to include a control unit 211, a storage unit 212 composed of an HDD (Hard Disk Drive), an SSD (Solid State Drive), or the like, and an input unit 213 composed of a keyboard, a remote controller, a touch panel, or the like, a display unit 214, a bus line 215, an input and output interface unit 220, a vehicle speed sensor 221, an angular velocity sensor 222, an acceleration sensor 223, a steering angle sensor 224, and a GNSS (Global Navigation Satellite System) receiver 225.

The vehicle speed sensor 221 detects, for example, a current speed of a vehicle on which the on-vehicle device 200 is mounted by using a speed detection process or the like using a vehicle speed pulse or the like to be acquired from the vehicle, and outputs speed data. The angular velocity sensor 222 detects, for example, an angular velocity of a change in direction of the vehicle, and outputs angular velocity data and relative bearing data per unit time. The acceleration sensor 223 detects, for example, acceleration of the vehicle in a front-rear direction, and outputs acceleration data or the like per unit time. The steering angle sensor 224 detects a steering angle of the vehicle, and outputs steering angle data or the like. The GNSS receiver 225 receives navigation radio waves from a GNSS satellite, and outputs GNSS positioning data.

The storage unit 212 stores data for displaying various images (including detailed route images and simple route images, which will be described later) on the display unit 214. For example, map data for displaying a map, map information used in searching for a route, road link information, and the like are stored. In addition, the storage unit 212 stores various programs such as an operating system and an application program. In particular, the storage unit 212 stores a display control program for switching and displaying a detailed route image and a simple route image, which will be described later, on the display unit 214. It is to be noted that the various programs may be acquired from, for example, a server device or the like via a network, or may be read from a recording medium such as a CD, a DVD, or a USB memory.

The input unit 213 receives an input operation of a user, and transmits an operation signal indicating an operation content to the control unit 211.

The display unit 214 displays an image based on the image data under the control of the control unit 211. The display unit 214 includes, for example, a graphics controller 214a, a buffer memory 214b composed of a memory such as a VRAM (Video RAM), a display 214c composed of a liquid crystal display or the like. In this configuration, the graphics controller 214a controls the entire display unit 214, based on control data sent from the control unit 211 via the bus line 215. In addition, the buffer memory 214b temporarily stores image data that can be displayed immediately. Then, the image is displayed on the display 214c, based on the image data output from the graphics controller 214a.

The control unit 211 includes a CPU 211a that controls the entire control unit 211, a ROM 211b in which a control program and the like for controlling the control unit 211 is stored beforehand, and a RAM 211c that temporarily stores various data. Then, the CPU 211a functions as various unit by reading and executing various programs stored in the ROM 211*b* and the storage unit 212. The control unit 211 or the CPU 211*a* corresponds to a "computer".

Further, the control unit 211 is coupled to the vehicle speed sensor 221, the angular velocity sensor 222, the acceleration sensor 223, the steering angle sensor 224, and the GNSS receiver 225 via the bus line 215 and the input and output interface unit 220.

The control unit 211 performs satellite positioning based on the GNSS positioning data, autonomous positioning based on the speed data, the angular velocity data, the relative bearing data, the acceleration data, the steering angle data, and the like, or hybrid positioning or the like that combines the above data, and acquires current location information indicating the current location (a latitude, a longitude, and an altitude) of an own vehicle (which will be referred to as "the own vehicle" in some cases).

[2. Image Switching Control by Control Unit 211]

The control unit 211 controls switching of the image to be displayed on the display 214*c* by sending the image data that has been generated based on the map data and the like stored in the storage unit 212 and the control data related to switching of the image to the display unit 214. The control is performed by the control unit 211 executing the display control program. Hereinafter, the image to be displayed on the display 214*c* and image switching control by the control unit 211 will be described with reference to FIGS. 3A-3F.

[2.1. Control of Switching from Detailed Route Image to Simple Route Image]

Figure 3:
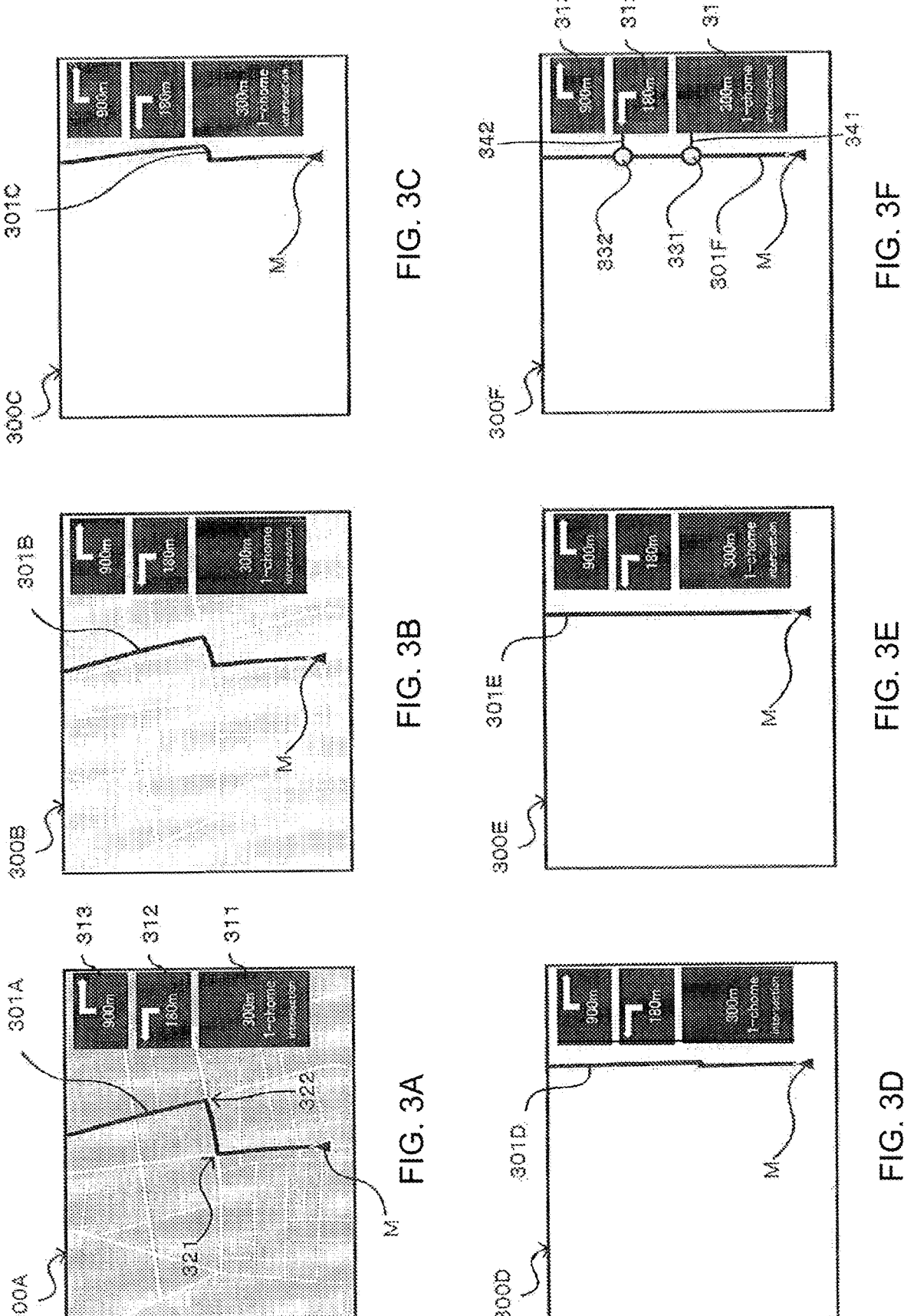
FIGS. 3A-3F are diagrams showing an image transition example at the time of switching from a detailed route image 300A to a simple route image 300F according to an example.

FIGS. 3A-3F are diagrams showing an image transition example in switching from the detailed route image to the simple route image. FIG. 3A is a diagram showing an example of a detailed route image 300A, and FIG. 3F is a diagram showing an example of a simple route image 300F. In addition, FIGS. 3B to 3E are diagrams respectively showing examples of intermediate images 300B to 300E, which are displayed in the process while the image is being switched from the detailed route image 300A to the simple route image 300F.

The detailed route image 300A and the simple route image 300F are each a route guidance image for guiding a user along a route to a destination, and each display an own vehicle mark M indicating the own vehicle mounted with the on-vehicle device 200 and route lines 301A and 301F.

In the present example, a user can choose a display mode when the route guidance image is displayed on the display 214*c* from two display modes. The display mode includes a detailed mode and a simple mode. In a case where the detailed mode is chosen, the control unit 211 displays the detailed route image 300A, and in a case where the simple mode is chosen, the control unit 211 displays the simple route image 300F.

It is to be noted that in the present example, a process of displaying an image before image switching (the detailed route image 300A) is referred to as a first process, and a process of displaying another image after the image switching (the simple route image 300F) is referred to as a second process.

The detailed route image 300A includes a map depicting the route line 301A indicating the route to the destination and location point information representations 311, 312, and 313 respectively representing information related to location points on the route line 301A. In the detailed route image 300A, the map is always displayed so that the traveling direction is an upward direction, and the own vehicle mark M is fixedly displayed at a location of the lower center. The route line 301A is superimposed on roads on the map and is depicted with, for example, a color or thickness different from the color of the road, so that the user can distinguish between the road that is the route and the road that is not the route. Further, the route line 301A represents location points 321 and 322 on the route line 301A with its shape. That is, the route line 301A represents a location point on the route with a bent part of the line. The location point on the route is, for example, an intersection, a landmark, or the like, where a left or right turn is made.

The location point information representations 311, 312, and 313 respectively represent information related to location points on the route. In particular, the location point information representation 311 represents the information related to the location point 321, and the location point information representation 312 represents the information related to the location point 322.

In addition, the arrangement order of the location point information representations 311, 312, and 313 is based on a passing order of respectively corresponding location points from the current location of the own vehicle (hereinafter, "current location" indicates "current location of the own vehicle"). In the detailed route image 300A in the present example, the own vehicle mark M is fixedly displayed at the location of the lower center. Accordingly, in the order from the lower side, the location point information representation 311 that represents the information related to a first passing location point, the location point information representation 312 that represents information related to a second passing location point, and the location point information representation 313 that represents information related to a third passing location point are displayed.

Furthermore, in the example of the detailed route image 300A, a location point where to make a course change next after passing through the location point 322 (the third passing location point) along the route line 301A cannot be displayed on the detailed route image 300A. However, the location point information representation 313 corresponding to the location point where to make a course change next is displayed. In this situation, since the location point corresponding to the location point information representation 313 is not represented in the shape of the route line 301A, a display form (for example, the displayed color) for the location point information representation 313 may be different from those of the location point information representations 311 and 312. It is to be noted that regarding the number of the location point information representations to be displayed, the number of the representations that have been set may be displayed up to the number that can be displayed in the display area.

Examples of the information related to the location points represented by the location point information representation 311, 312, and 313 include a direction of making a turn at the location point, a distance from the current location to the location point, a name of the location point, and the like. In the present example, the direction of making a turn at the location point 321, the distance from the current location to the location point 321, and the name of the location point 321 are represented by the location point information representation 311 corresponding to the first passing location point 321. The directions of making turns at the location points and the distances from the current location to the location points are respectively displayed by the location point information representation 312 and the location point information representation 313 respectively corresponding to the second and third passing location points. However, the location point information representations corresponding to the second and subsequent location points may respectively represent the directions of making turns at the location points, the distances from the current location to the location points, and the names of the location points, or some of the above information representations may be represented.

Then, when the user performs an operation of switching the display mode from the detailed mode to the simple mode, the control unit 211 switches the image from the detailed route image 300A to the simple route image 300F.

The simple route image 300F includes a route line 301F, which is a straight line indicating a route to a destination, and the location point information representations 311, 312, and 313, which respectively represent the information related to the location points on the route. When comparing the detailed route image 300A and the simple route image 300F, in the detailed route image 300A, the route line 301A represents the location points 321 and 322 on the route with its shape, whereas in the simple route image 300F, the route line 301F does not represent the location points 321 and 322 on the route with its shape. In addition, the map is not displayed on the simple route image 300F. Furthermore, regarding the location point information representations 311, 312, and 313, no change is made in the display forms or the display locations between the detailed route image 300A and the simple route image 300F. No change is made in the display form or the display location of the location point information representations 311, 312, and 313. Accordingly, it is unlikely for the user to lose sight of the image when the image is switched from the detailed route image 300A to the simple route image 300F. It is to be noted that at least one of the display form and the display location may be displayed to be substantially identical to each other. In this case, it is possible to prevent the user from being confused as compared with a case where the display form and the display position are both changed.

The simple route image 300F does not represent the location point 321 or 322 on the route with the shape of the route line 301F. Hence, it is difficult for the user to understand the correspondence relation with the location point information representations 311 and 312. For this reason, the control unit 211 determines points on the route line 301F respectively corresponding to the location points 321 and 322, and represents the points with location point marks 331 and 332. A location point mark has a display form by which the user can recognize at a glance as a point on the route line 301F. It is to be noted that the location point mark in the present example has a display form that is circular and larger in diameter than the thickness of the route line 301F. However, any other display form may be used, as long as the user can understand at a glance as a point on the route line 301F.

The user can understand correspondence relations between the route line 301F and the location point information representations 311 and 312, from positional relationships between the location point marks 331 and 332 and the own vehicle mark M and a positional relationship (an arrangement order) between the location point information representations 311 and 312 (that is, the location point mark 331 corresponds to the location point information representation 311, and the location point mark 332 corresponds to the location point information representation 312). The simple route image 300F includes a connection line 341 connecting the location point mark 331 and the location point information representation 311, and a connection line 342 connecting the location point mark 332 and the location point information representation 312. Consequently, the user can clearly understand that the location point mark 331 corresponds to the location point information representation 311, and the location point mark 332 corresponds to the location point information representation 312.

Here, a description will be given with regard to a method, by the control unit 211, for determining the points (the locations where the location point marks are drawn) on the route line 301F respectively corresponding to the location points 321 and 322. First, the control unit 211 determines a point corresponding to the location point 321 on the route line 301F, so that a length from the vehicle mark M to the location point 321 in the detailed route image 300A and a length from the vehicle mark M to the location point mark 331 in the simple route image 300F are substantially identical to each other. Consequently, the length to the first passing location point does not change in the detailed route image 300A or the simple route image 300F. Therefore, the image can be switched from the detailed route image 300A to the simple route image 300F without giving the user an uneasy feeling.

In addition, the control unit 211 determines a point corresponding to the location point 322 on the route line 301F, based on a length from a point represented by the location point mark 331 on the route line 301F to the own vehicle mark M, and travel distances from the current location to the location point 321 and from the location point 321 to the location point 322. In the example of FIGS. 3A-3F, the travel distance from the current location to the location point 321 is 300 m, and the travel distance from the location point 321 to the location point 322 is 180 m. Here, in a case where the length from the point represented by the location point mark 331 on the route line 301F to the own vehicle mark M is 2.5 cm, a point 1.5 cm (=(2.5×180)/300) ahead from the point represented by the location point mark 331 is determined to be the point corresponding to the location point 322.

The control unit 211 determines the points on the route line 301F respectively corresponding to the location points 321 and 322, as the vehicle travels, and repeats a process of changing the locations representing the location point marks 331 and 332. Consequently, the locations of the location point marks 331 and 332 move in a direction closer to the own vehicle mark M, as the own vehicle travels.

On the other hand, the control unit 211 does not immediately switch the image from the detailed route image 300A to the simple route image 300F. The control unit 211 switches and displays the detailed route image 300A, the intermediate images 300B to 300E, and the simple route image 300F in this order.

The intermediate images 300B to 300E respectively display the own vehicle mark M and the route lines 301B to 301E indicating the route. The intermediate images 300B to 300E represent a process of changing from the shape of the route line 301A in the detailed route image 300A to the shape (a straight line shape) of the route line 301F in the simple route image 300F. In addition, as shown in the intermediate image 300B and the intermediate image 300C, the map displayed in the detailed route image 300A is gradually erased.

As described heretofore, in the on-vehicle device 200 in the present example, the control unit 211 (an example of "the first processing unit" and "the second processing unit") causes the display 214c (an example of "the display unit") to display the detailed route image 300A (an example of "a first image") including a line, which indicates a route and which is the route line 301A (an example of "a first line") representing the location points 321 and 322 on the route with a shape of the line, and the location point information representations 311 and 312 representing information related to the location points 321 and 322. The control unit 211 displays the simple route image 300F (an example of "a second image"), which is displayed by switching from the detailed route image 300A. The simple route image 300F displays the route line 301F (an example of "a second line") having a shape different from that of the route line 301A to respectively associate the location points 321 and 322 with the location point information representations 311 and 312.

Therefore, according to the on-vehicle device 200 in the present example, the display image is switched from the detailed route image 300A including the route line 301A and the location point information representations 311 and 312, to the simple route image 300F, which displays the route line 301F having a shape different from that of the route line 301A to respectively associate the location points 321 and 322 on the route line 301A with the location point information representations 311 and 312. Accordingly, the user can easily understand the correspondence relation between the location point on the route and the location point information representation also in the image after switching.

In addition, in the on-vehicle device 200 in the present example, in the second process, the control unit 211 displays the simple route image 300F including the location point marks 331 and 332 (an example of "a symbol") indicating the correspondence relation between the points on the route line 301F respectively corresponding to the location points 321 and 322, and the location point information representations 311 and 312 respectively related to the location points 321 and 322. Consequently, the user can easily understand the correspondence relation between the location point on the route and the location point information representation.

Furthermore, in the on-vehicle device 200 in the present example, the control unit 211 (a determination processing unit) performs a determination process of determining a location of the point on the route line 301F, based on a distance to the location point from a current location as a reference, and displays the simple route image 300F, in which the location point marks 331 and 332 are displayed at the locations that have been determined in the second process. Consequently, the user can understand a feeling of distance from the current location to each location point and a feeling of distance between the respective location points.

Furthermore, in the on-vehicle device 200 in the present example, in the second process, the control unit 211 causes the simple route image 300F to be displayed such that the location point information representations 311, 312, and 313 displayed in the simple route image 300F have at least one of a substantially identical display form or a substantially identical display location to the location point information representations 311, 312, and 313 displayed in the detailed route image 300A. Consequently, it is possible to prevent the user from being confused due to a change in the display form regarding the location point information representations 311, 312, and 313.

Furthermore, in the on-vehicle device 200 in the present example, the length of the line indicating from the location of the own vehicle mark M (the current location) on the route line 301A to the first passing location point 321 in the detailed route image 300A and the length of the line indicating from the location of the own vehicle mark M (the current location) on the route line 301F to the location point mark 331 indicating the first passing location point in the simple route image 300F are substantially identical to each other. Consequently, in the detailed route image 300A and the simple route image 300F, it is possible to prevent the user from being confused by a change in the length of the line indicating the first passing location point from the current location between on the route line 301A and on the route line 301F and a change in the distance indicated by the line to a guided location point, that is, a change in scale.

[3. Modification]

Next, modifications of the present example will be described. It is to be noted that the modifications described below can be combined as appropriate.

[3.1. 1st Modification]

Figure 4:
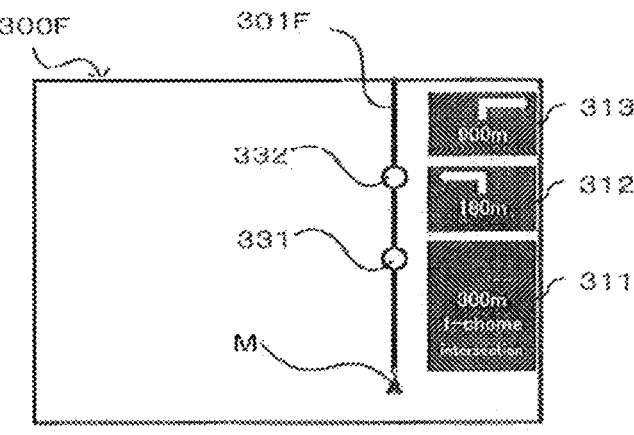
FIG. 4 is a diagram showing a first modification of the simple route image 300F.

In the above example, as shown in FIG. 3F, the connection lines 341 and 342 respectively connecting the location point marks 331 and 332 and the location point information representations 311 and 312 are displayed in the simple route image 300F. However, as shown in FIG. 4, the connection lines 341 and 342 may not be necessarily displayed. By displaying the location point marks 331 and 332 and the location point information representations 311 and 312 in the passing order from the current location, the correspondence relations between the location point marks 331 and 332 and the location point information representations 311 and 312 can be understood, even when the connection lines 341 and 342 are not displayed.

[3.2. 2nd Modification]

Figure 5:
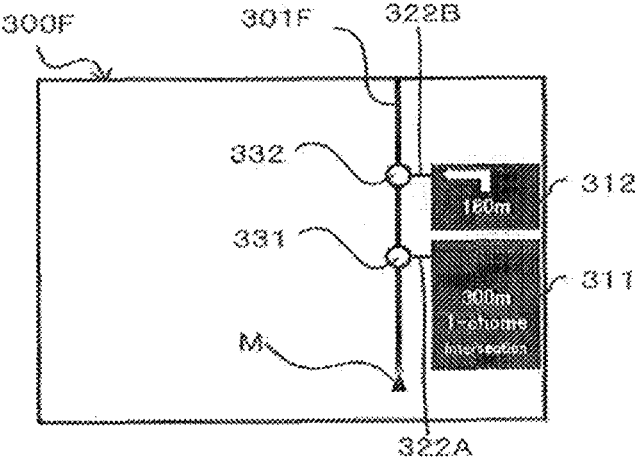
FIG. 5 is a diagram showing a second modification of the simple route image 300F.

In the above example, as shown in FIG. 3A, in the detailed route image 300A, the location point where to make a course change next after the location point 322 on the route line 301A cannot be displayed on the detailed route image 300A. However, the location point information representation 313 corresponding to the location point where to make the course change next is also displayed. In accordance with this, as shown in FIG. 3F, the location point information representation 313 is also displayed in the simple route image 300F. However, as shown in FIG. 5, the location point information representation 313 related to the location point where the location point mark is not displayed may not be necessarily displayed. Then, when it becomes possible to represent the location point where to make the course change next after the location point 322 with the location point mark as the own vehicle travels, the control unit 211 displays the location point mark and the location point information representation 313 that represents the information related to the location point indicated by the location point mark.

[3.3. 3rd Modification]

Figure 6:
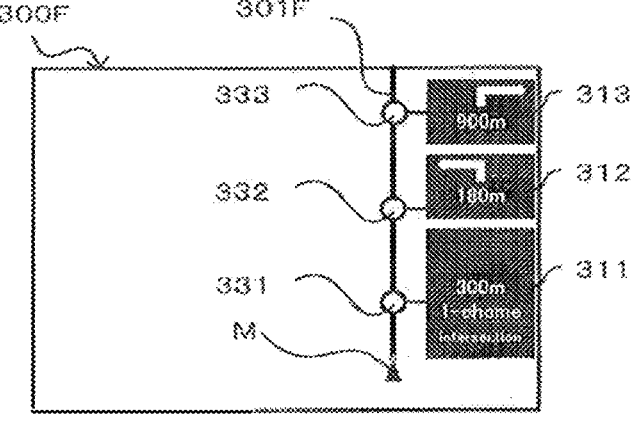
FIG. 6 is a diagram showing a third modification of the simple route image 300F.

In the above example, as shown in FIGS. 3A and 3F, the location point mark 331 is displayed so that the length from the own vehicle mark M to the location point 321 in the detailed route image 300A and the length from the own vehicle mark M to the location point mark 331 in the simple route image 300F are substantially identical to each other, and the location point mark 332 is displayed at a location on which the actual distances from the current location to the location points 321 and 322 are reflected. However, the location where the location point mark is displayed may be determined according to the number of the location point information representations to be displayed in the simple route image 300F. For example, as shown in FIG. 6, in a case where three location point information representations are displayed, the three location point marks 331, 332, and 333 respectively corresponding to the location points 321, 322, and 323 may be displayed so that the locations are evenly spaced apart from each other. In this case, even though the corresponding location point mark is not displayed, an uneasy feeling that the location point information representation is displayed will not be given to the user.

[3.4. 4th Modification]

Figure 7:
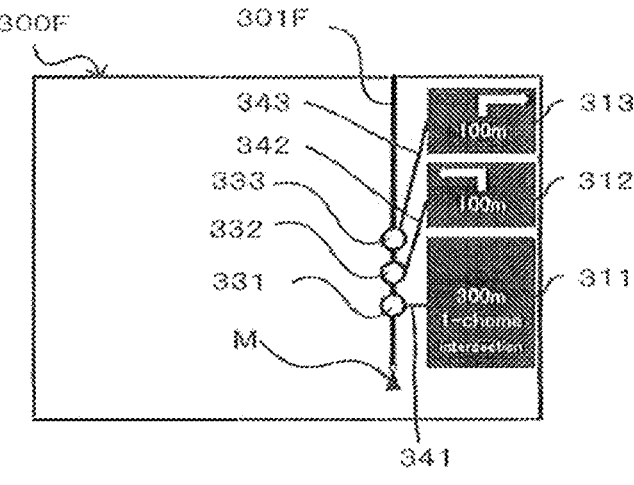
FIG. 7 is a diagram showing a fourth modification of the simple route image 300F.

In the above example, as shown in FIG. 3F, in the simple route image 300F, the connection lines 341 and 342 respectively connecting the location point marks 331 and 332 and the location point information representations 311 and 312 are displayed to be horizontal. However, the connection lines may be displayed diagonally. For example, as shown in FIG. 7, in a case where the distance from the current location to the location point where the information is represented by the location point information representation 311 is 300 m, the distance from the current location to the location point where the information is represented by the location point information representation 312 is 400 m, and the distance from the current location to the location point where the information is represented by the location point information representation 313 is 500 m (that is, the distance between the location points is 100 m), the location point marks 331, 332, and 333 representing the respective location points are displayed in close proximity to each other on the route line 301F. In such a case, the connection lines 341, 342, and 343 are displayed so as to clarify the correspondence relations between the location point marks 331, 332, and 333 and the location point information representations 311, 312, and 313. In this situation, the connection lines 342 and 343 may be displayed diagonally.

[3.5. 5th Modification]

Figure 8:
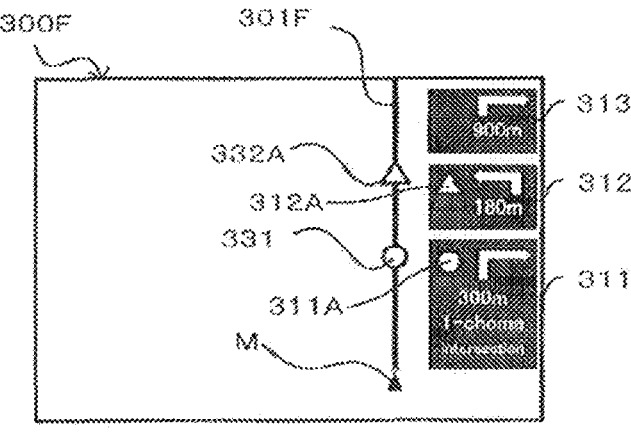
FIG. 8 is a diagram showing a fifth modification of the simple route image 300F.

In the above example, as shown in FIG. 3F, the connection lines 341 and 342 respectively connecting the location point marks 331 and 332 and the location point information representations 311 and 312 are displayed in the simple route image 300F. However, instead of this, the display forms of the location point marks displayed on the route line 301F may be different from each other, and the display form of each location point mark may be displayed in association with the location point information representation. For example, as shown in FIG. 8, the location point mark 331 indicating the location point 321 representing the information with the location point information representation 311 is displayed in the display form of a white circle. A location point mark 332A indicating the location point 322 representing the information with the location point information representation 312 is displayed in the display form of a white triangle. A mark 311A having the display form of the white circle is displayed in the location point information representation 311. A mark 312A having the display form of the white triangle is displayed in the location point information representation 312. Consequently, the correspondence relation between the location point mark 331 and the location point information representation 311 and the correspondence relation between the location point mark 332 and the location point information representation 312 can be clarified.

[3.6. 6th Modification]

Figure 9:
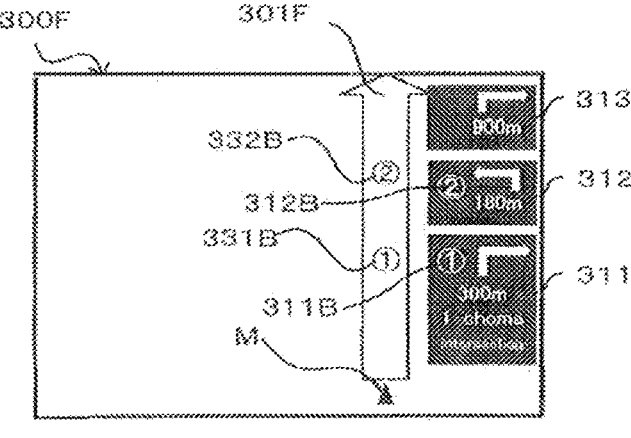
FIG. 9 is a diagram showing a sixth modification of the simple route image 300F.

As shown in FIG. 9, the route line 301F displayed in the simple route image 300F may be displayed to be thicker in a bar shape. By making the route line 301F thicker, the marks can be displayed inside the line. Accordingly, a mark that clarifies the correspondence relation between the location point and the location point information representation may be displayed there. For example, a location point mark 331B indicating the location point 321 where the information is represented by the location point information representation 311 is displayed in the display form of "circled 1". A location point mark 332B indicating the location point 322 where the information is represented by the location point information representation 312 is displayed in the display form of "circled 2". A mark 311B having the display form of "circled 1" is displayed in the location point information representation 311. A mark 312B having the display form of "circled 2" is displayed in the location point information representation 312. Consequently, the correspondence relation between the location point mark 331B and the location point information representation 311 and the correspondence relation between the location point mark 332B and the location point information representation 312 can be clarified.

[3.7. 7th Modification]

Figure 10:
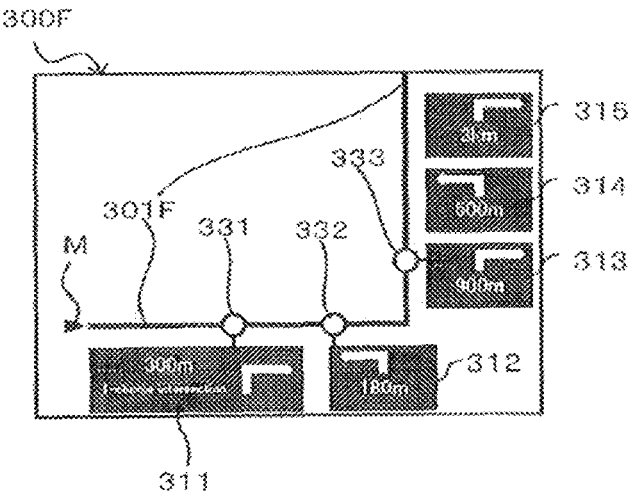
FIG. 10 is a diagram showing a seventh modification of the simple route image 300F.

In the above example, as shown in FIG. 3F, the route line 301F displayed in the simple route image 300F is a straight line. However, as shown in FIG. 10, the route line 301F may be bent. In this manner, by displaying the route line 301F along the lower part and the right part of the simple route image 300F, more location point information representations 311, 312, 313, 314, and 315 can be displayed than those in the example of 3F.

[3.8. 8th Modification]

In the above example, an intersection or a location point where to make a course change has been described as an example of the location point where the related information is displayed by the location point information representation. However, a location point where a facility such as a store, which is a stopover, exists may be used.

[3.9. 9th Modification]

In the above example, as shown in FIG. 3A, in a case where the information related to the intersection is displayed as the location point information representation 311, the traveling direction, the distance, and the intersection name are displayed. However, only the traveling direction may be displayed. Information related to a vehicle lane (a lane) may be additionally displayed.

REFERENCE SIGNS LIST 100 display control device
101 first processing unit
102 second processing unit
200 vehicle device
211 control unit
211a CPU
211b ROM
211c RAM
212 storage unit
213 input unit
214 display unit
214a graphics controller
214b buffer memory
214c display
215 bus line
220 input and output interface unit
221 vehicle speed sensor
222 angular velocity sensor
223 acceleration sensor
224 steering angle sensor
225 GNSS receiver

The invention claimed is:

1. An image control device comprising:
a display control unit that controls images to be displayed on the display unit; and
an acquisition unit that acquires a user operation,
wherein the display control unit switches the image to be displayed on the display unit from a first image to a second image based on the user operation acquired by the acquisition unit, wherein the first image is an image that includes a first line and a location point information representation, the first line being a line indicating a route and representing a guided location point on the route with a shape of the first line, the location point information representation representing information related to a guided location point, wherein the second image is an image that includes a second line, a location point mark and the location point information representation, the second line being a line indicating the route and having a shape different from the shape of the first line, the location point mark been displayed at the position on the second line corresponding to the location point information representation, and wherein a length of a line indicating from a current location to a first location point on the first line is identical to a length of a line indicating from the current location to the first location point on the second line.

2. The image control device according to claim 1, wherein the connecting line indicating a correspondence between the location point mark on the second line that represents a same point as the guided location point and the location point information representation.

3. The image control device according to claim 1, wherein the second line represents no guided location point with the shape of the line.

4. The image control device according to claim 1, wherein the second image includes a symbol indicating a correspondence relation between a point on the second line corresponding to the guided location point and the location point information representation related to the point.

5. The image control device according to claim 1, further comprising a determination processing unit that determines a location of the location point mark on the second line, based on a distance to the guided location point from the current location as a reference, wherein the second image displays a symbol at the location determined by the determination processing unit.

6. The image control device according to claim 1, wherein the second image is displayed such that the location point information representation displayed in the second image has at least one of a substantially identical display form or a substantially identical display location to the location point information representation displayed in the first image.

7. The image control device according to claim 1, wherein the location point information representation represents information related to the guided location point where the left turn or the right turn is made, an intersection, or a landmark on the route.

8. The image control device according to claim 1, wherein the second line includes a straight line that is converted from the first line.

9. An image control method by an image control device, the image control method comprising:

a display controlling step of controlling images to be displayed on a display unit; and an acquiring step of acquiring a user operation, wherein the display controlling step switches the image to be displayed on the display unit from a first image to a second image based on the user operation acquired by the acquiring step, wherein the first image is an image that includes a first line and a location point information representation, the first line being a line indicating a route and representing a guided location point on the route with a shape of the first line, the location point information representation representing information related to the guided location point, wherein the second image is an image that includes a second line, a location point mark and the location point information representation, the second line being a line indicating the route and having a shape different from the shape of the first line, the location point mark been displayed at the position on the second line corresponding to the location point information representation, and wherein a length of a line indicating from a current location to a first location point on the first line is identical to a length of a line indicating from the current location to the first location point on the second line.

10. The image control device according to claim 8, wherein the first line is the route.

* * * * *